United States Patent
Araki

(10) Patent No.: US 7,242,541 B2
(45) Date of Patent: Jul. 10, 2007

(54) FABRICATION OF MEMS ZOOM LENS STRUCTURE

(75) Inventor: Shinichi Araki, Sunnyvale, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 97 days.

(21) Appl. No.: 11/072,068

(22) Filed: Mar. 3, 2005

(65) Prior Publication Data

US 2006/0056084 A1   Mar. 16, 2006

Related U.S. Application Data

(60) Provisional application No. 60/610,439, filed on Sep. 16, 2004.

(51) Int. Cl.
*G02B 7/02* (2006.01)

(52) U.S. Cl. .................................. 359/824; 359/823

(58) Field of Classification Search ............. 359/823, 359/824; 369/44.15, 44.16
See application file for complete search history.

(56) References Cited

U.S. PATENT DOCUMENTS

| 4,385,373 A * | 5/1983 | Howe .................. 369/44.15 |
| 5,734,490 A * | 3/1998 | Rabarot et al. ............ 359/210 |
| 6,636,368 B2 * | 10/2003 | Ohtaka ..................... 359/824 |
| 2006/0056076 A1 * | 3/2006 | Araki et al. ................ 359/811 |

* cited by examiner

*Primary Examiner*—David N. Spector
(74) *Attorney, Agent, or Firm*—Brian N. Young; Trellis Intellectual Property Law Group, PC

(57) ABSTRACT

A method for fabricating a MEMS zoom lens device. The device is formed substantially on a silicon substrate and includes control circuitry formed on the substrate, multiple actuators having charge areas for creating electrostatic fields, a flexible support for flexibly coupling a lens to the substrate, an electrostatic layer coupled to the lens. The charge areas act in response to the control circuitry to apply an electrostatic force to the electrostatic layer to move the lens with respect to the substrate and optical sensors or detectors. In a preferred embodiment, the flexible support is formed in a serpentine shape from silicon nitride. A stop support is formed to underlie the flexible support to prevent damage to the flexible support in a rest (i.e., non-zoomed) position.

9 Claims, 6 Drawing Sheets

FABRICATION OF MEMS ZOOM LENS STRUCTURE

RELATED APPLICATIONS

This application claims the benefit of U.S. Provisional Application No. 60/610,439, entitled "Movable Lens Mechanism", filed Sep. 16, 2004, which is incorporated herein by reference in its entirety as if set forth in full in this document.

BACKGROUND

Microelectromechanical (MEM) systems (MEMS), such as arrays of small mirrors controlled by electric charges, are known in the art. MEMS devices are desirable because of their small size, potential lower cost, and higher performance. Some types of devices that have been built using MEMS techniques include accelerometers, gyroscopes, temperature sensors, chemical sensors, AFM (atomic force microscope) probes, micro-lenses, actuators, etc. Such devices can be integrated with microelectronics, packaging, optics, and other devices or components to realize complete MEMS systems. Some examples of MEMS systems include inertial measurement units, optical processors, sensor suites, and micro robots.

Although MEMS techniques, and other related fields such as nanotechnology, have been used successfully to fabricate many types of devices, there are still various problems to be overcome in manufacturing increasingly complex devices.

SUMMARY

One embodiment of the invention provides a method for fabricating a MEMS zoom lens device. The device is formed substantially on a silicon substrate and includes control circuitry formed on the substrate, multiple actuators having charge areas for creating electrostatic fields, a flexible support for flexibly coupling a lens to the substrate, an electrostatic layer coupled to the lens. The charge areas act in response to the control circuitry to apply an electrostatic force to the electrostatic layer to move the lens with respect to the substrate and optical sensors or detectors.

In a preferred embodiment, the flexible support is formed in a serpentine shape from silicon nitride. A stop support is formed to underlie the flexible support to prevent damage to the flexible support in a rest (i.e., non-zoomed) position.

One embodiment of the invention provides a method for producing a microelectromechanical device, the method comprising: forming a substrate; forming a flexible support coupled to the substrate; coupling a lens to the flexible support so that the lens is flexibly coupled to the substrate; and forming one or more actuators for moving the lens with respect to an optical sensor.

DETAILED DESCRIPTION

Figure 1:
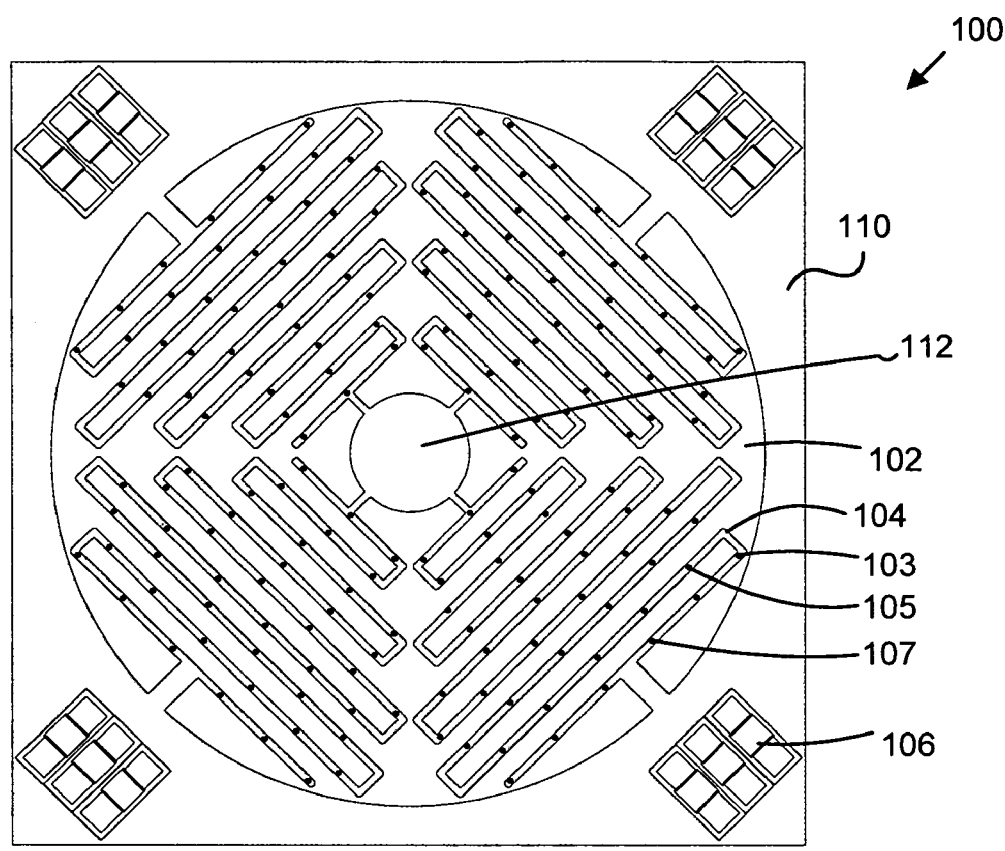
FIG. 1 shows a top view of a MEMS zoom lens assembly.

FIG. 1 shows a top view of a MEMS zoom lens assembly. Although embodiments of the invention are discussed with respect to specific structures, measurements, materials, arrangements or other characteristics, other embodiments can vary from those shown.

In FIG. 1, assembly 100 includes base 110 that can be a silicon substrate or other microelectronic or MEMS construct. Lens support post 112 attaches lens 102 to flexible support 104. In a preferred embodiment four flexible supports are attached between the support post and base. Each flexible support is a formed in a serpentine shape to achieve spring-like properties so that the lens attached to the support post can be moved with respect to the base. An arrangement of "bumps" is used to prevent the flexible support structures from moving beyond a desired point. The bumps are shown in FIG. 1 at, for example, 103, 105 and 107.

Four actuators 106 are provided at each corner of the assembly. Note that other embodiments can use more or less actuators. The actuators can be of different shapes (e.g., curved ring portions, elongated bars, etc.) and can be positioned at arbitrary locations on the base.

Figure 2:
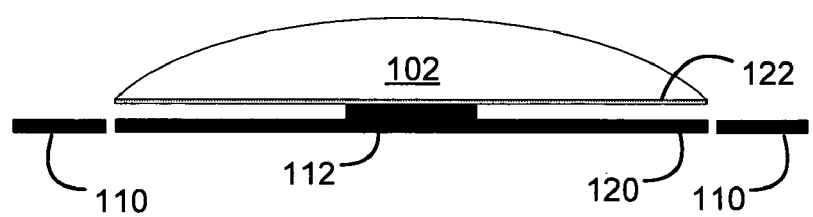
FIG. 2 shows a side view of the assembly of FIG. 1.

FIG. 2 shows a side view of the assembly of FIG. 1. In general, the same reference number used in different Figures denotes the same component. In FIG. 2, lens 102 is shown upon lens support post 112 which is attached to flexible support 120. Lens 102 is provided with an electrostatic layer 122 along the bottom side of the lens. In other embodiments more than one lens may be used. Also, lenses can have different shapes and can be provided with one or more electrostatic layers in any suitable shape, size and fixed mounting relative to the lens(es). In some embodiments the electrostatic layer can be integral with, or a part of, the lens, as where part of the lens material, itself, is provided with a charge. Base 110 is shown on either side of flexible support 120.

Figure 3:
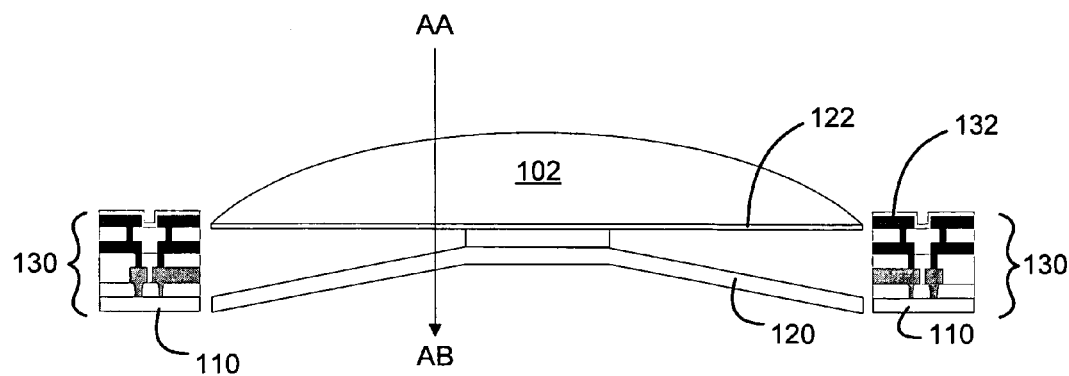
FIG. 3 shows actuators on a base.

FIG. 3 shows actuators 130 upon base 110. Each actuator can selectively apply a force to electrostatic layer 122 as, for example, by using an electrostatic or magnetic effect. In a preferred embodiment, actuators exert a force upon the electrostatic layer in a region such as charge region 132 in actuator 130. Charge regions in different actuators around the electrostatic layer are coordinated to cause the lens to raise or lower with respect to base 110. Optical detectors beneath the lens (e.g., coupled to the base) detect light that passes through the lens in a direction AA–AB. Various of the structures—lens 102, electrostatic layer 122, support post 112, flexible support 120—can be made optically transparent, as desired. Details of the operation, structure and formation of an exemplary lens can be found in the related co-pending application, referenced above.

Next, FIGS. 4–18 are discussed to provide details of a method of fabrication of a MEMS zoom lens assembly.

Figure 4:
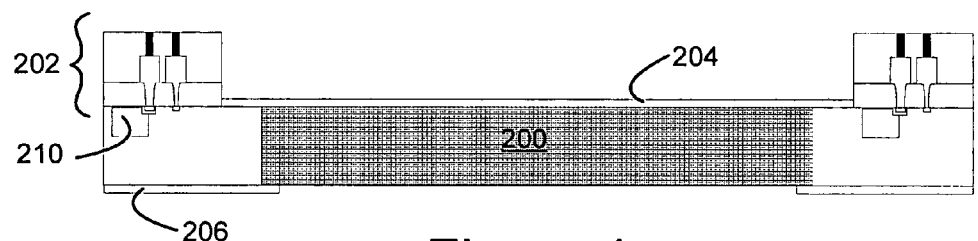
FIG. 4 is a diagram of a first stage of device fabrication.

FIG. 4 illustrates silicon substrate 200 that includes microelectronic circuit fabrication areas such as microelectronic circuit area 210. Such circuitry can include any type of electrical component such as transistors, diodes, capacitors, conductors, resistors, etc. Any suitable process technology can be used to achieve, for example, metal oxide semiconductor (MOS), complimentary MOS (CMOS), bipolar, etc., components. The substrate can be made of any suitable material such as silicon, germanium, etc. In general, constructs described herein may be formed with any suitable materials and with any effective methods.

Photoresist layers 204 and 206 are applied to the top and back, respectively, of the substrate. A portion of back photoresist layer 206 is removed to expose the substrate. Actuator mounting block 202 is formed above the circuit area 210. Note that in FIG. 4 both the left and right sides of the assembly are symmetrical. That is, a back photoresist layer, circuit area and actuator mounting block are also formed on the right side of the substrate. The actuator mounting blocks allow control circuitry in the circuitry areas to control the actuators, as described below. A top layer of SiN is provided onto the substrate. Note that the order of formation of different components or constructs may vary in different fabrication approaches. It is anticipated that, for example, achieving the structure shown in FIG. 4 will include several microelectronic and/or MEMS fabrication steps such as LOCOS process, well process, field formation, gate formation, chemical vapor deposition, metallization, reflow, etc.

Figure 5:
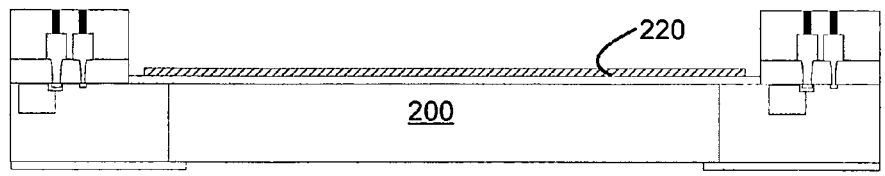
FIG. 5 is a diagram of a second stage of device fabrication.
Figure 6:
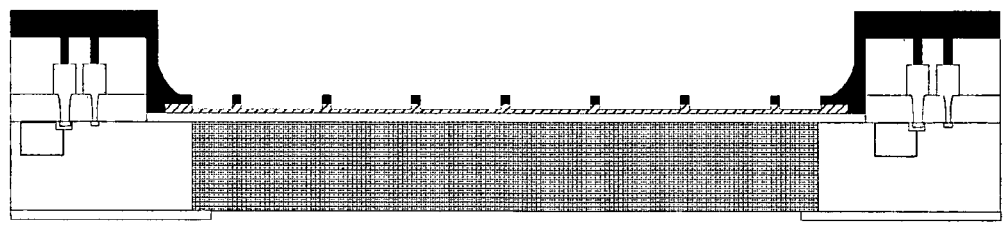
FIG. 6 is a diagram of a third stage of device fabrication.
Figure 7:
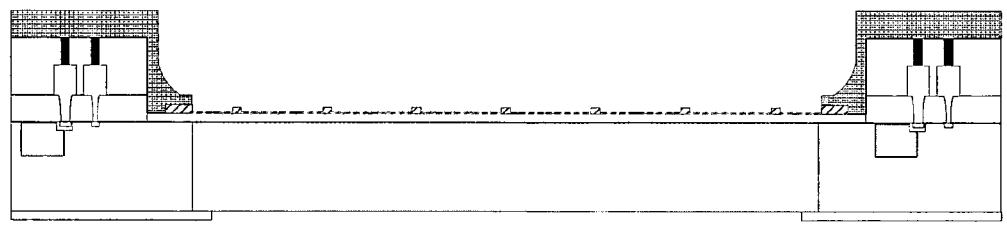
FIG. 7 is a diagram of a fourth stage of device fabrication.

FIG. 5 shows a later stage in the fabrication of the assembly. In FIG. 5, substrate 200 has been boron doped in the area at the back of the substrate not covered by resist. SiN layer 220 is deposited on top of the top resist layer. FIG. 6, shows the result of a resist layer applied selectively (shown in solid black) and then etching the top SiN layer to provide bumps. FIG. 7 shows the photoresist removed to reveal the SiN bumps.

Figure 8:
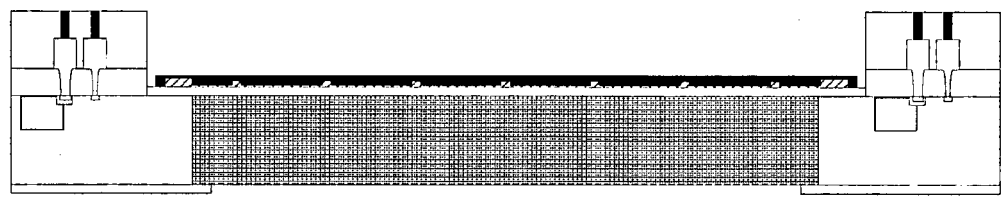
FIG. 8 is a diagram of a fifth stage of device fabrication.
Figure 9:
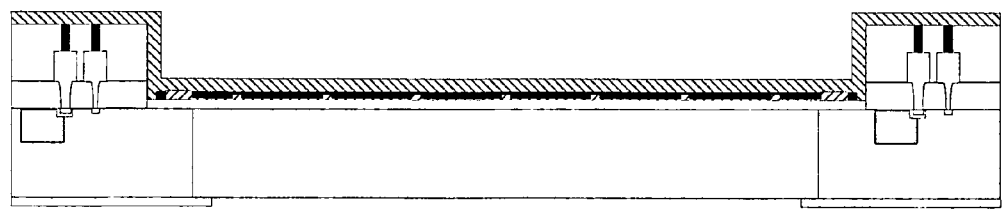
FIG. 9 is a diagram of a sixth stage of device fabrication.
Figure 10:
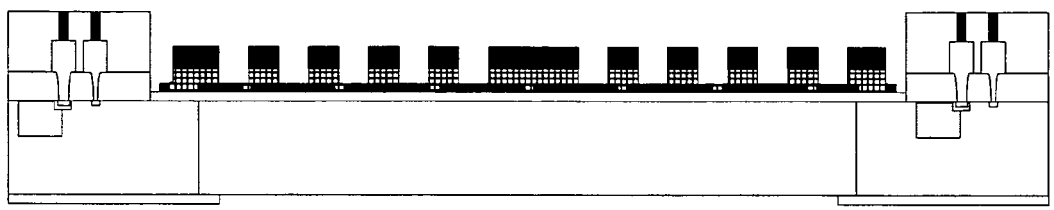
FIG. 10 is a diagram of a seventh stage of device fabrication.
Figure 11:
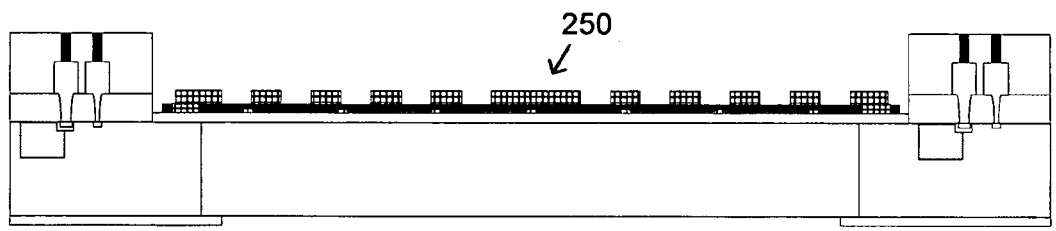
FIG. 11 is a diagram of a eighth stage of device fabrication.

FIG. 8 shows a sacrificial layer of photoresist (solid black) applied over the bumps. FIG. 9 shows a SiN deposition step. The SiN layer in FIG. 9 is used to form the serpentine "springs" in a later step. Note that other designs can be used to achieve a flexible support for the lens. For example, other embodiments can use a more angular zig-zag pattern, less angular sinusoidal pattern, solid sheet of flexible material, etc. In some cases, three dimensional strands such as coiled springs might be used. In general, the flexible support can be any suitable shape or shapes. More than one type of material can be used. The SiN bumps are used to support the springs and prevent the springs, lens support and lens from going beyond a desired rest, or stop, position. This can be important, for example, to provide a calibrated non-zoom position, to protect the flexible support structure, and also to protect any optical sensors that may be positioned close to the lens. FIG. 10 shows a stage where the serpentine springs have been formed by etching through the top resist mask (in solid black). FIG. 11 shows the resist removed to leave the springs exposed. The larger structure at 250 is the central portion where the springs meet and where the support post will be formed.

Figure 12:
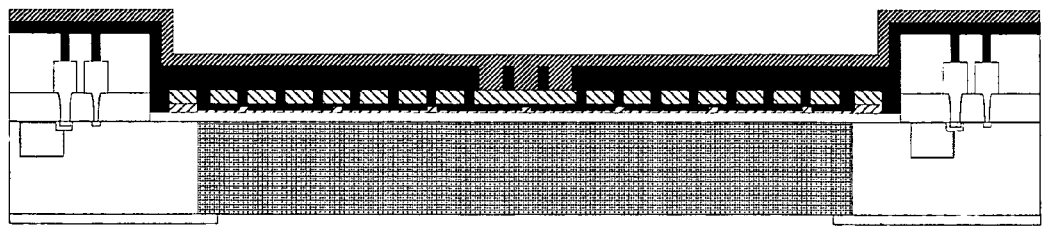
FIG. 12 is a diagram of a ninth stage of device fabrication.
Figure 13:
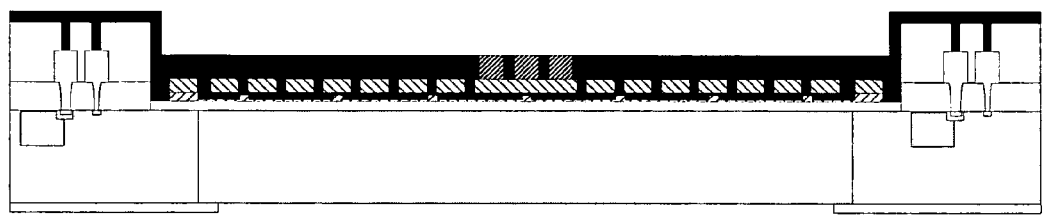
FIG. 13 is a diagram of a tenth stage of device fabrication.
Figure 14:
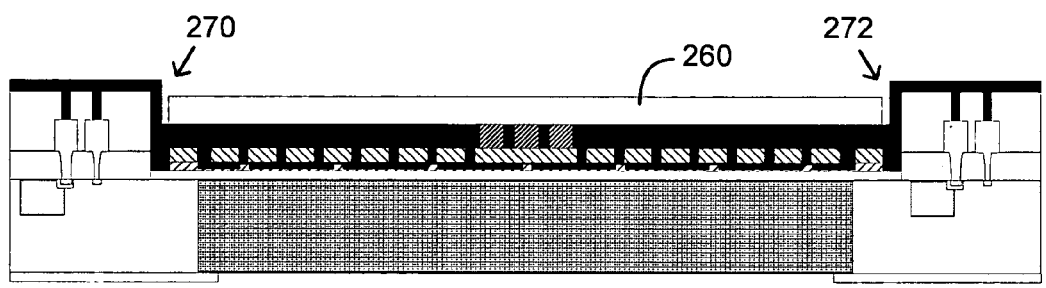
FIG. 14 is a diagram of a eleventh stage of device fabrication.

FIG. 12 shows a resist layer (solid black) patterned to allow formation of the lens support post from a SiN layer. FIG. 13 shows the result of a blanket SiN etching step where only the support post formation at the middle of the springs remains. FIG. 14 shows a Niobium Oxide electrostatic layer 260 formed by sputtering over the arrangement of FIG. 13. Photoresist and etching steps are used to create gaps 270, 272 around the perimeter of the electrostatic layer. Other materials used to fabricate semiconductor and/or microelectromechanical (MEM) machines may be used for these and the other structures shown and described, and fabrication may be done using known semiconductor and MEM machine fabrication procedures.

Figure 15:
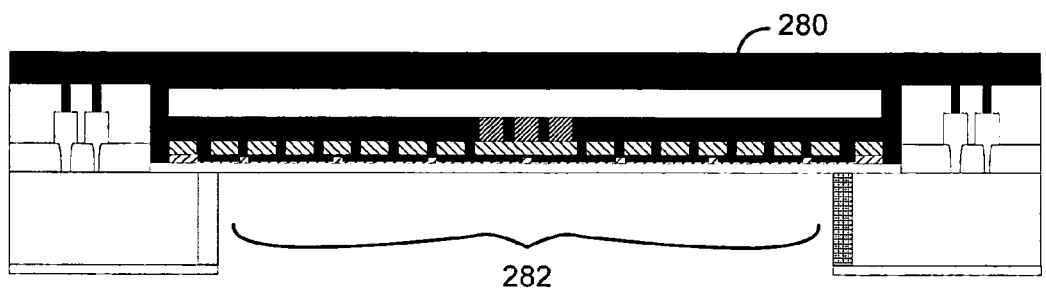
FIG. 15 is a diagram of a twelfth stage of device fabrication.
Figure 16:
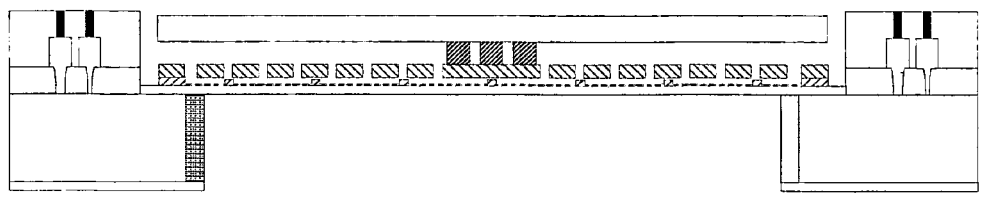
FIG. 16 is a diagram of a thirteenth stage of device fabrication.

FIG. 15 shows the fabrication at a stage after resist coating 280 has been applied to the top of the device. KOH back etching has been performed at the back of the device to remove the substrate in the area of 282. FIG. 16 shows the device after sacrificial ashing is used to remove the resist.

Figure 17:
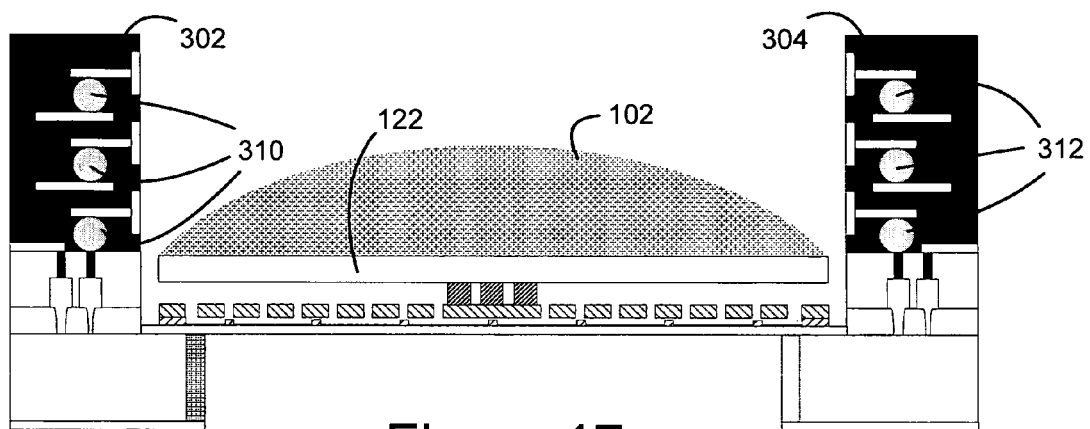
FIG. 17 is a diagram of a fourteenth stage of device fabrication.

FIG. 17 shows actuators 302 and 304 attached to the device with printed circuit board techniques. Electrodes, or charge generators, are set at accurate spacing with bump balls 310 and 312. In other embodiments, different numbers, types and arrangements of electrodes are possible. Other techniques can be used to attach or fashion the actuators. Lens 102 is affixed to electrostatic layer by 122 using a mount process. In other embodiments different mounting processes may be used. For example, a wafer mount process might be used.

Figure 18:
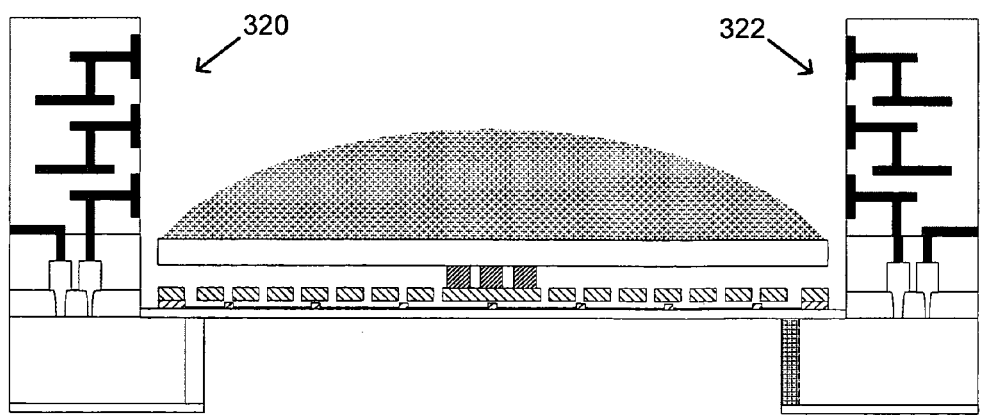
FIG. 18 is a diagram of a fifteenth stage of device fabrication.

FIG. 18 shows an alternative construction for the electrodes. In FIG. 18, the actuators and electrodes are made by a glass wafer process using a glass substrate, metallization and metal etching steps. Other fabrication methods may be used for the actuators and electrodes.

Although the invention has been described with respect to specific embodiments thereof, these embodiments are merely illustrative, and not restrictive, of the invention. Spaces shown within or around components or structures of the device may be filled with air, other gas or liquid, or there may be a substantial vacuum within the spaces. In some embodiments the lens apparatus can be sealed from the ambient environment, and in other embodiments the lens apparatus can be open to the ambient environment. The charges on the actuators may be variable by discrete or continuous amounts, controlled by either digital or analog control signals. In some embodiments, the charge position is moved on the one or more actuators, such as by charging two or more address electrodes in an addressable circuit. Control circuitry for the actuators may be formed in or on a portion of the base, or may be separate from the base.

Aspects of the invention may be realized on different size scales than those presented herein. Although MEMS techniques have primarily been presented, macro, nano or other designs, sizes and fabrication techniques may be used to advantage in different embodiments.

In the drawings, well known elements may be omitted so as to more clearly illustrate embodiments of the invention. For example, components and fabrication steps for semiconductor, microelectromechanical systems (MEMS), discrete components, etc., may be omitted and still achieve desired structures or results. Similarly, steps can be added without departing from the scope of the invention.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, as used herein, "above," "below," "underlying," "overlying" and the like are used primarily to describe possible relations between elements, but should not be considered otherwise limiting. Such terms do not, for example, necessarily imply contact with or between elements or layers.

Embodiments of the invention may be implemented by using a programmed general purpose digital computer, by using application specific integrated circuits (ASICs), programmable logic devices (PLDs), field programmable gate arrays (FPGAs), optical, chemical, biological, quantum or nanoengineered systems, components and mechanisms may be used. In general, the functions of the present invention can be achieved by any means as is known in the art. Distributed, networked systems, and/or components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for producing a microelectromechanical device, the method comprising:
    forming a substrate;
    forming a flexible support coupled to the substrate;
    coupling a lens to the flexible support so that the lens is flexibly coupled to the substrate; and
    forming one or more actuators for moving the lens with respect to an optical sensor; and
    forming an electrostatic layer coupled to the lens, wherein an electric field from an actuator in the one or more actuators exerts a force on the electrostatic layer.

2. The method of claim 1, further comprising:
    forming multiple charge areas in an actuator.

3. The method of claim 2, wherein the charge areas are formed along a direction of movement of the lens so the lens position is controlled in response to a selection of charges applied to the charge areas.

4. The method of claim 3, wherein the charge areas are responsive to an electrical signal.

5. The method of claim 4, further comprising:
    forming control circuitry on the substrate, wherein the control circuitry generates the electrical signal.

6. The method of claim 1, further comprising:
    forming an opening in the substrate, wherein the opening is substantially beneath the lens.

7. The method of claim 1, further comprising:
    forming a stop support to prevent the flexible support from exceeding a predetermined position.

8. The method of claim 7, wherein the stop support is formed of silicon nitride.

9. The method of claim 1, wherein the flexible support includes multiple serpentine shapes.

* * * * *